United States Patent
Momiyama et al.

(10) Patent No.: US 6,832,144 B2
(45) Date of Patent: Dec. 14, 2004

(54) VEHICLE OPERATION CONTROL METHOD AND VEHICLE OPERATION CONTROL APPARATUS

(75) Inventors: Minekazu Momiyama, Chiryu (JP); Shinji Takeuchi, Okazaki (JP); Toshio Kohno, Nagoya (JP); Yuzo Imoto, Aichi-ken (JP); Yoshiyuki Yasui, Nagoya (JP); Wataru Tanaka, Anjo (JP); Yuji Muragishi, Nagoya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 31 days.

(21) Appl. No.: 10/617,122

(22) Filed: Jul. 11, 2003

(65) Prior Publication Data

US 2004/0068353 A1 Apr. 8, 2004

(30) Foreign Application Priority Data

Jul. 12, 2002 (JP) .......................... 2002-203421

(51) Int. Cl.⁷ .............................................. B62D 11/00
(52) U.S. Cl. ............................ 701/41; 701/42; 180/446
(58) Field of Search ............................. 701/41, 42, 43; 180/443, 445, 446, 408, 413

(56) References Cited

U.S. PATENT DOCUMENTS

| | | | | |
|---|---|---|---|---|
| 4,998,593 A | * | 3/1991 | Karnopp et al. | 180/408 |
| 5,828,973 A | * | 10/1998 | Takeuchi et al. | 701/41 |
| 6,324,445 B2 | * | 11/2001 | Tozu et al. | 701/1 |
| 6,438,474 B1 | * | 8/2002 | Tanaka et al. | 701/41 |
| 6,553,293 B1 | * | 4/2003 | Hac | 701/42 |
| 6,580,988 B2 | * | 6/2003 | Lin et al. | 701/41 |
| 2003/0221898 A1 | | 12/2003 | Yasui et al. | |
| 2004/0016594 A1 | | 1/2004 | Yasui et al. | |
| 2004/0019417 A1 | | 1/2004 | Yasui et al. | |

* cited by examiner

Primary Examiner—Richard M. Camby
(74) Attorney, Agent, or Firm—Oblon, Spivak, McClelland, Maier & Neustadt, P.C.

(57) ABSTRACT

The vehicle operation control apparatus multiplies the variable gain G controlled based on the vehicle velocity V, the steering angle θh, the steering angle velocity ωh and the actual steering angle θT with the steering angle θh, and controls the actual steering angle θT of the driven wheels on a result of this multiplication. Consequently, the additional turning time gear ratio Ga1 or the turning-back gear ratio Ga2, set up individually, can be selected depending on the turning direction of the steering wheel. Therefore, the steering feeling both at the time of additional turning and turning-back can be improved.

6 Claims, 9 Drawing Sheets

VEHICLE OPERATION CONTROL METHOD AND VEHICLE OPERATION CONTROL APPARATUS

CROSS-REFERENCE TO RELATED APPLICATIONS

The present application claims priority under 35 U.S.C. §119 to Japanese Patent Application No. JP2002-203421. The contents of these applications are incorporated herein by reference.

BACKGROUND OF THE INVENTION

1. Field of the Invention

The present invention relates to a vehicle operation control method and vehicle operation control apparatus for controlling an actual steering angle of a driven wheel based on a steering angle of a steering wheel and vehicle velocity.

2. Description of Related Art

Figure 1:
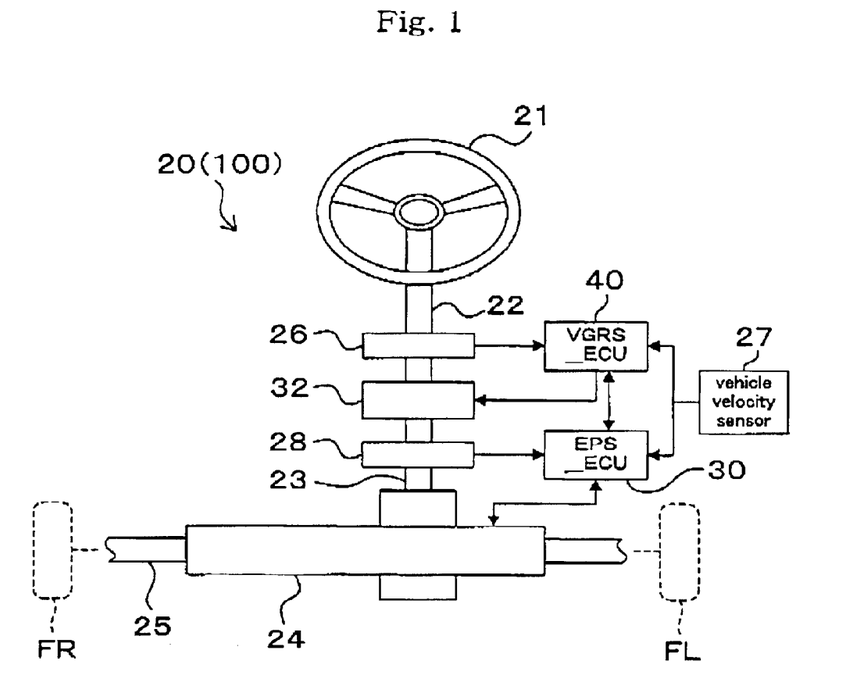
FIG. 1 is an explanatory diagram showing schematically the structure of the vehicle operation control apparatus.

As a vehicle operation control apparatus including a transmission ratio changing mechanism for changing the transmission ratio by driving a motor, provided halfway of a steering transmission system which connects a steering wheel to driven wheels, a vehicle operation control apparatus 100 which comprises a steering wheel 21, a first steering shaft 22, a second steering shaft 23, an EPS actuator 24, a rod 25, a steering angle sensor 26, a vehicle velocity sensor 27, a torque sensor 28, an EPS ECU 30, a gear ratio changing mechanism 32 (transmission ratio changing mechanism), a VGRS ECU 40 and the like, as shown in FIG. 1, is available. In the meantime, such "a transmission ratio changing mechanism for changing a transmission ratio by driving an electric motor, located halfway of a steering transmission system which connects the steering wheel to the driven wheel" is sometimes called variable gear ratio system (referred to as VGRS, hereinafter) depending on a case.

That is, an end of the first steering shaft 22 is connected to the steering wheel 21 and an input side of the gear ratio changing mechanism 32 is connected to the other end side of this first steering shaft 22. This gear ratio changing mechanism 32 comprises a motor, a reduction gear and the like. An end side of the second steering shaft 23 is connected to this output side of the gear ration changing mechanism 32 and an input side of the EPS actuator 24 is connected to the other end side of the second steering shaft 23. The EPS actuator 24 is an electric type powered steering system, which is capable of converting a rotary motion inputted by the second steering shaft 23 through a rack and pinion gear (not shown) to a motion in the axial direction of the rod 25 and outputting it. Further, this EPS actuator 24 generates an assist force depending on a steering condition by means of an assist motor which is controlled by the EPS ECU 30 so as to assist steering by a driver. In the meantime, this rod 25 is mounted on driven wheels FR, FL.

A rotation angle (steering angle) of the first steering shaft 22 is detected by a steering angle sensor 26 and inputted to the VGRS ECU 40 as a steering angle signal. A steering torque by the second steering shaft 23 is detected by a torque sensor 28 and inputted to the EPS ECU 30 as a torque signal. Further, a vehicle velocity is detected by a vehicle velocity sensor 27 and inputted to the EPS ECU 30 and VGRS ECU 40 as a vehicle velocity signal. Additionally, the EPS actuator 24 contains a tire angle sensor (not shown) capable of detecting a tire angle (actual steering angle) from a moving amount of rod 25.

With such a structure, ratio between input gear and output gear is changed depending on vehicle velocity at real time by means of a motor and reduction gear in the gear ratio changing mechanism 32 and VGRS ECU 40 so as to change a ratio of output angle of the second steering shaft 23 relative to the steering angle of the first steering shaft 22. The EPS actuator 24 and the EPS ECU 30 generate an assist force for assisting steering of the vehicle driver by means of an assist motor depending on vehicle driver's steering condition and vehicle velocity detected by means of the torque sensor 28 and the vehicle velocity sensor 27.

Consequently, the steering gear ratio corresponding to the vehicle velocity can be set. For example, an output angle to a second steering shaft 23 by the gear ratio changing mechanism 32 can be set to be increased with respect to the steering angle of the steering wheel at the time of vehicle stop or traveling at a low velocity. Further, the output angle of the gear ratio changing mechanism 32 can be set to be decreased with respect to the steering angle of the steering wheel 21 at the time of traveling at a high velocity. Meanwhile, an appropriate assist force corresponding to the vehicle velocity can be generated by means of an assist motor.

For example, if a vehicle is stopped or traveling at a low velocity, the steering gear ratio by the gear ratio changing mechanism 32 is set low and an assist force is intensified by an assist motor, so that the driven wheels can be steered largely even with a light steering operation. This facilitates the steering operation of a vehicle driver. On the other hand, if the vehicle is traveling at a high velocity, the assist force by the assist motor drops and the steering ratio by the gear ratio changing mechanism 32 is set high. Consequently, the steering operation becomes heavy and even if the steering wheel 21 is turned largely, it comes that the driven wheels are steered a little. Consequently, it can be expected that vehicle control stability is further improved.

However, in such a vehicle operation control apparatus 100, a steering gear ratio is set up corresponding to a vehicle velocity by a gear ratio changing mechanism 32 controlled by the VGRS ECU 40. Thus, when a vehicle driver executes a quick steering by turning the steering wheel 21 suddenly, a follow-up delay by the control of the gear ratio changing mechanism 32 occurs. Consequently, because the steering control on the driven wheels FR, FL continues toward an object angle even after the vehicle driver terminates his steering operation, the vehicle driver is provided with a feeling of disharmony in his driving operation, thereby the steering feeling being worsened.

Thus, in order to prevent the steering feeling from being worsened due to this follow-up delay, the JP 11-208499 A has proposed a "vehicle steering apparatus" in which if a control deviation between an object rotation angle by a transmission ratio changing mechanism and its output angle exceeds a predetermined threshold, this control deviation is adjusted so as to block the control deviation from exceeding a predetermined threshold.

With such a structure, when the steering wheel 21 is turned back slowly at the time of its turning-back even if it is turned suddenly at the time of its additional turning, a difference in steering amount of driven wheels FR, FL occurs although the same amount steering operation is executed at the times of the additional turning and turning-back. Thus, even if a vehicle driver returns the steering wheel 21 to its neutral position, the driven wheels FR, FL are not returned to the neutral position, so that the neutral position is deviated. Consequently, the vehicle driver is supplied with a feeling of disharmony in his steering, thereby the steering feeling being worsened.

JP 2000-344121 A has proposed a "vehicle steering control apparatus" in which the control deviation between the object angle and output angle of the VGRS adjusted at the time of a quick steering is memorized and when the steering wheel 21 is operated, its phase is corrected gradually so that this memorized control deviation becomes zero, thereby the deviation in the neutral position being corrected. However, even with such a structure, the deviation in the neutral position just after the quick steering cannot be blocked because correction of the deviation in the phase is carried out gradually.

SUMMARY OF THE INVENTION

Accordingly, the present invention has been achieved to solve the above-described problem and an object of the present invention is to provide a vehicle operation control method and vehicle operation control apparatus capable of improving the steering feeling.

In order to achieve the above object, according to the present invention, a vehicle operation control method for controlling an actual steering angle of driven wheels based on a steering angle by a steering wheel and vehicle velocity, comprising:

a first step of obtaining a steering angle velocity based on the steering angle by the steering wheel;

a second step of obtaining the actual steering angle of the driven wheels;

a third step of controlling a variable gain based on the vehicle velocity, the steering angle, the steering angle velocity and the actual steering angle;

a fourth step of multiplying the variable gain with the steering angle; and a fifth step of controlling the actual steering angle of the driven wheels based on a result of multiplication in the fourth step.

Further, in order to achieve the above object, according to the present invention, a vehicle operation control apparatus for controlling an actual steering angle of driven wheels based on a steering angle by a steering wheel and vehicle velocity, comprising:

a steering angle velocity obtaining means for obtaining a steering angle velocity based on the steering angle by the steering wheel;

an actual steering angle obtaining means for obtaining the actual steering angle of the driven wheels;

a variable gain control means for controlling a variable gain based on the vehicle velocity, the steering angle, the steering angle velocity and the actual steering angle;

a multiplying means for multiplying the variable gain with the steering angle; and an actual steering angle control means for controlling the actual steering angle of the driven wheels based on a result of multiplication by the multiplying means.

According to the present invention, the variable gain controlled based on the vehicle velocity, the steering angle, the steering angle velocity and the actual steering angle is multiplied with the steering angle and the actual steering angle of the driven wheels is controlled based on a result of this multiplication. Consequently, it comes that the variable gain is controlled based on not only the vehicle velocity but also the steering angle, the steering angle velocity and the actual steering angle and thus, the gain control which depends upon not only the vehicle velocity but also the steering angle, the steering angle velocity and the actual steering angle can be executed. That is, as compared to a case where the variable gain is controlled based on only the vehicle velocity, the variable gain can be controlled based on the steering angle velocity by the steering wheel, the turning direction or the actual steering angle of the driven wheels as well. For example, it can be so set up that at the time of additional turning, the follow-up delay in the actual angle control of the driven wheels due to a quick steering is corrected and that at the time of turning-back, a deviation in the neutral position of the steering wheel is corrected. Therefore, the steering feeling can be improved.

Further, in accordance with the more preferred teaching of the present invention, the third step comprises:

a 3a step of judging which the turning direction of the steering wheel is in an additional turning direction which increases the steering angle or in a turning-back direction which decreases the steering angle, based on the steering angle and the steering angle velocity; and a 3b step of if the turning direction of the steering wheel judged in the 3a step is the additional turning direction, selecting an additional turning time variable gain as the variable gain and if the turning direction is the turning-back direction, selecting the turning-back time variable gain as the variable gain.

Still further, in accordance with the more preferred teaching of the present invention, the variable gain control means comprises:

a turning direction judgment means for judging which the turning direction of the steering wheel is in an additional turning direction which increases the steering angle or in a turning-back direction which decreases the steering angle, based on the steering angle and the steering angle velocity; and a variable gain selection control means for, if the turning direction of the steering wheel judged by the turning direction judgment means is the additional turning direction, selecting an additional turning time variable gain as the variable gain and if the turning direction is the turning-back direction, selecting the turning-back time variable gain as the variable gain.

In accordance with the more preferred teaching of the present invention, in controlling the variable gain based on the vehicle velocity, the steering angle, the steering angle velocity and the actual steering angle, which the turning direction of the steering wheel is additional turning direction which increases the steering angle or turning-back direction which decreases the steering angle is judged based on the steering angle and the steering angle velocity. Then, if it is judged that the turning direction of the steering wheel is the additional turning direction, an additional turning time variable gain is selected as the variable gain and if it is judged that the turning direction is the turning-back direction, the turning-back time variable gain is selected as the variable gain. Consequently, the additional turning time variable gain or the turning-back time variable gain set up individually can be selected depending on the turning direction of the steering wheel. Thus, it can be so set up that the additional turning time variable gain corrects the follow-up delay in the actual steering angle control of the driven wheels due to a quick steering and that the turning-back time variable gain corrects the deviation in the neutral position of the steering wheel. Thus, the steering feeling can be improved both at the times of the additional turning and turning-back.

In accordance with the more preferred teaching of the present invention, as for the additional turning time variable gain of the third step, the variable gain is determined based on the vehicle velocity and the steering angle velocity and as for the turning-back time variable gain of the third step, the variable gain is determined based on the steering angle and the actual steering angle.

Further, in accordance with the more preferred teaching of the present invention as for the additional turning time variable gain by the variable gain control means, that variable gain is determined based on the vehicle velocity and the steering angle velocity and as for the turning-back time variable gain by the variable gain control means, that variable gain is determined based on the steering angle and the actual steering angle.

In accordance with the more preferred teaching of the present invention, as for the additional turning time variable gain, the variable gain is determined based on the vehicle velocity and the steering angle velocity and as for the turning-back time variable gain, the variable gain is determined based on the steering angle and the actual steering angle. Consequently, because the additional turning time variable gain is determined based on not only the vehicle velocity but also the steering angle velocity, the additional turning time variable gain can be determined corresponding to the steering angle velocity attained by the steering wheel. Further, because as for the turning-back time variable gain, the variable gain is determined based on the steering angle and the actual steering angle regardless of the vehicle velocity, the turning-back time variable gain can be determined according to a ratio between the both such that the driven wheels are located at a neutral position when the steering wheel is located at the neutral position. Therefore, the steering feeling can be improved both at the time of the additional turning and turning-back.

In the meantime, the additional turning time variable gain may be determined based on a product between a first gain characteristic set up according to increase/decrease of the vehicle velocity and a second gain characteristic which decreases following an increase in the steering angle velocity. Further, as for the turning-back time variable gain, that variable gain may be determined based on a result obtained by dividing a current actual steering angle corresponding to the steering angle by the steering angle.

Consequently, because the gain is decreased by the second gain characteristic following an increase in the steering angle velocity at the time of additional turning, the additional turning time variable gain at the time of a quick steering can be decreased by the product between the first gain characteristic and the second gain characteristic. Thus, a follow-up delay of the vehicle operation control due to a quick steering at the time of the additional turning can be suppressed, thereby the steering feeling being improved. Further, because the variable gain value is determined based on a result obtained by dividing a current actual steering angle corresponding to the steering angle by the steering angle when the steering wheel is turned back, the steering wheel can be turned back by an amount corresponding to the current actual steering angle. Therefore, because the steering wheel can be located at the neutral position after it is turned back, a deviation in the neutral position can be suppressed, thereby the steering feeling being improved.

DESCRIPTION OF THE PREFERRED EMBODIMENTS

Hereinafter, the embodiment of the vehicle operation control apparatus which the vehicle operation control method and vehicle operation control apparatus of the present invention are applied to will be described with reference to the accompanying drawings. Meanwhile, because the vehicle 6 operation control apparatus 20 of this embodiment is not different from the vehicle operation control apparatus 100 in terms of mechanical structure, the vehicle operation control apparatus 20 (100) shown in FIG. 1 will be described.

Figure 2:
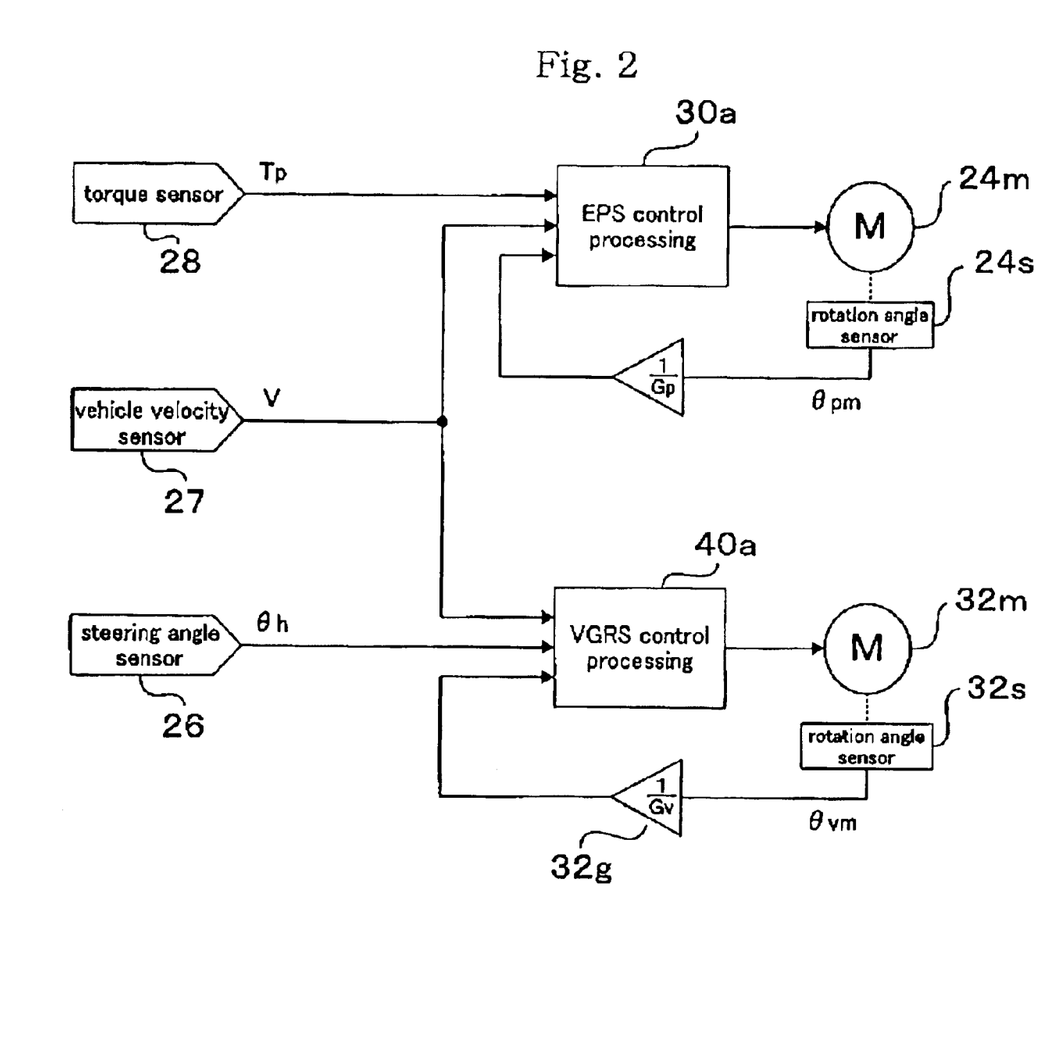
FIG. 2 is a functional block diagram showing the vehicle operation control processing by the EPS ECU and VGRS ECU of the vehicle operation control apparatus of the embodiment.

As shown in FIG. 1, a vehicle operation control apparatus 20 comprises a steering wheel 21, a first steering shaft 22, a second steering shaft 23, an EPS actuator 24, a rod 25, a steering angle sensor 26, a vehicle velocity sensor 27, a torque sensor 28, an EPS ECU 30, a gear ratio changing mechanism 32, a VGRS ECU 40 and the like. Because its mechanical and electrical connections have been already described, description thereof is omitted here. FIG. 2 shows a functional block diagram showing vehicle operation control processing by means of the EPS ECU 30 and VGRS ECU 40 of the vehicle operation control apparatus 20 of this embodiment.

As shown in FIG. 2, in the vehicle operation control apparatus 20 of this embodiment, two processings, that is, an EPS control processing 30a by the EPS ECU 30 and VGRS control processing 40a by the VGRS ECU 40 are carried out by an electronic control unit (ECU). That is the vehicle operation control apparatus 20 has a function for controlling the steering gear ratio by means of the gear ratio changing mechanism 32 according to VGRS control processing 40a with the VGRS ECU 40, depending on the vehicle velocity. Further, it has a function of assisting steering by the vehicle driver by generating an assist force depending on steering condition by means of the EPS control processing 30a with the EPS ECU 30.

In an EPS control processing 30a, if a steering torque signal from the torque sensor 28 and a vehicle velocity signal from the vehicle velocity sensor 27 are inputted to the EPS ECU 30, a current instruction value of the assist motor 24m of the EPS actuator 24, which is automatically determined depending on the vehicle velocity V, is determined according to a motor current map (not shown). A motor voltage corresponding to the determined current instruction value is supplied to the motor 24m by a motor driving circuit. Consequently, in the EPS actuator 24 and the EPS ECU 30, an assist force for assisting the steering by a vehicle driver is generated by the assist motor 24m through the EPS control processing 30a depending on vehicle driver's steering condition and vehicle velocity V detected by the torque sensor 28 and the vehicle velocity sensor 27.

In the VGRS control processing 40a, if a steering angle signal from the steering angle sensor 26, a vehicle velocity signal from the vehicle velocity sensor 27 and an actual steering angle signal from a tire angle sensor in the EPS actuator 24 are inputted to the VGRS ECU 40 directly or through other ECU, a processing for automatically determining a usage gear ratio Ga (transmission ratio by transmission ratio changing mechanism) by the gear ratio changing mechanism 32 according to a predetermined map based on the vehicle velocity V, steering angle θh, steering angle velocity ωh and actual steering angle θT is carried out. Then, a motor voltage corresponding to the determined rotation angle instruction value is supplied to the motor 32m by the motor driving circuit. Consequently, in the gear ratio changing mechanism 32 and the VGRS ECU 40, an output gear ratio to an input gear is changed by the motor 32m and a reduction gear 32g, corresponding to the vehicle velocity, steering angle and the like at real time and a ratio Gv of the output angle of the second steering shaft 23 to the steering angle of the first steering shaft 22 is changed.

The basic functional structure of the vehicle operation control processing of controlling the usage gear ratio Ga (variable gain G) of the gear ratio changing mechanism 32 based on the vehicle velocity V, the steering angle θh, the steering angle velocity ωh and the actual steering angle θT, which is a feature of the vehicle operation control apparatus 20, will be described with reference to FIG. 3.

Figure 3:
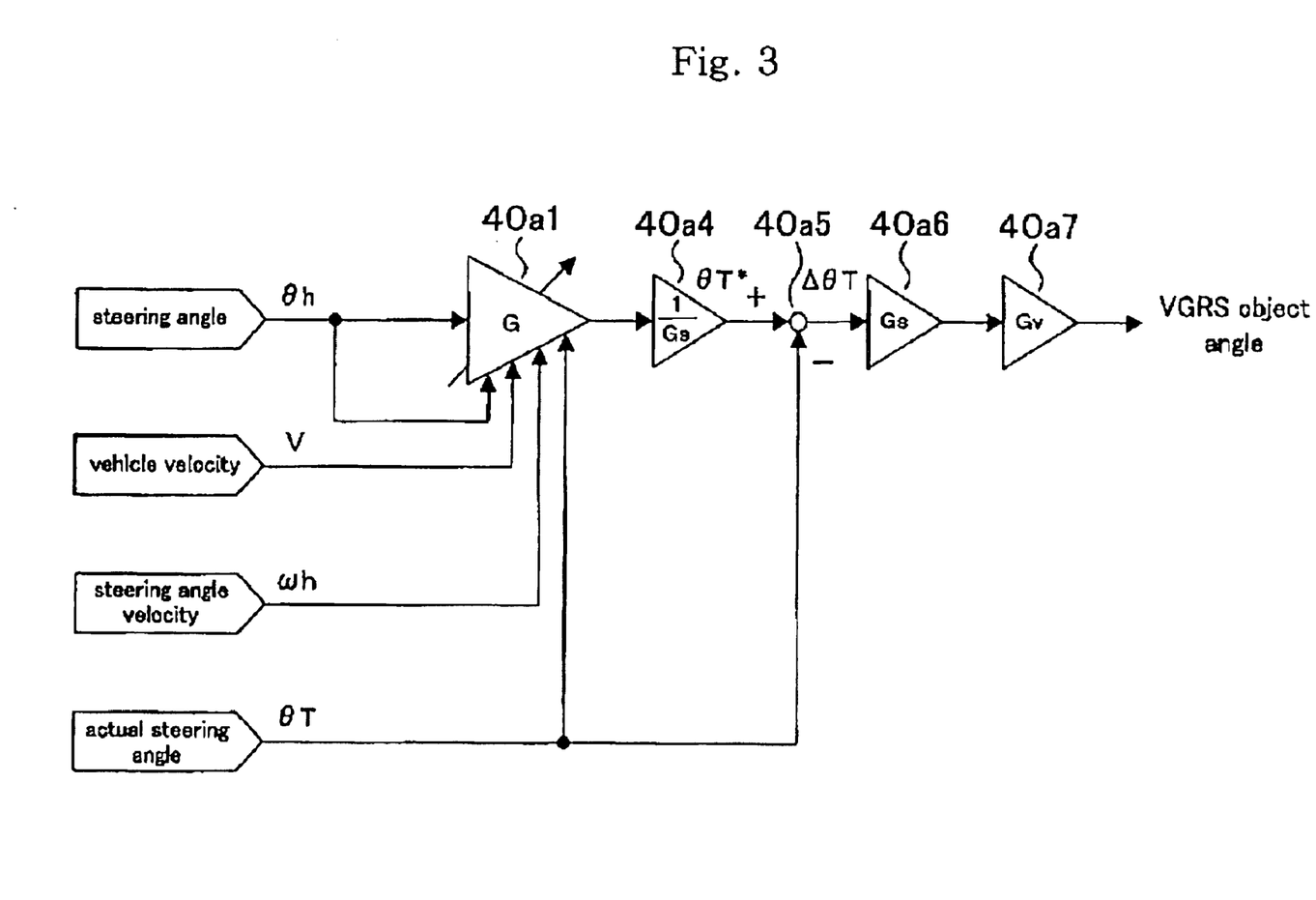
FIG. 3 is a functional block diagram showing a basic functional configuration of the vehicle operation control processing which is applied to the VGRS control processing of the embodiment.

As shown in FIG. 3, the vehicle operation control processing by the VGRS ECU 40 comprises an output steering angle determining means 40a1, an object actual steering angle computing means 40a4, a deviation amount detecting means 40a5, an object steering angle computing means 40a6 and a VGRS object angle computing means 40a7.

According to the vehicle operation control processing of this embodiment, the variable gain G controlled based on the vehicle velocity V, the steering angle θh, the steering angle velocity ωh and the actual steering angle θT is multiplied with the steering angle θh by the output steering angle determining means 40a1 so as to determine an output steering angle. Then, an output steering angle which is a result of this multiplication is converted to an object actual steering angle θT* by the object actual steering angle computing means 40a4. A deviation between this object actual steering angle θT* and the actual steering angle θT is obtained by the deviation amount detecting means 40a5 so as to compute an angle deviation ΔθT. The angle deviation ΔθT is converted to an object steering angle by the object steering angle computing means 40a6 and further, converted to a VGRS object angle by the VGRS object angle computing means 40a7 s as to obtain a VGRS object angle scheduled to be outputted to the gear ratio changing mechanism 32 based on this object steering angle. In the meantime, the Gs indicated in FIG. 3 indicates a steering gear ratio which is a ratio between the steering angle θh and the actual steering angle θT, while the Gv indicates a gear ratio of the reduction gear 32g which is accommodated in the gear ratio changing mechanism 32.

Accordingly, because to in the vehicle operation control processing, the variable gain G is controlled based on not only the vehicle velocity V but also the steering angle θh, the steering angle velocity ωh and the actual steering angle θT, gain control depending on not only the vehicle velocity V but also the steering angle θh, the steering angle velocity ωh and the actual steering angle θT can be performed.

Figure 9:
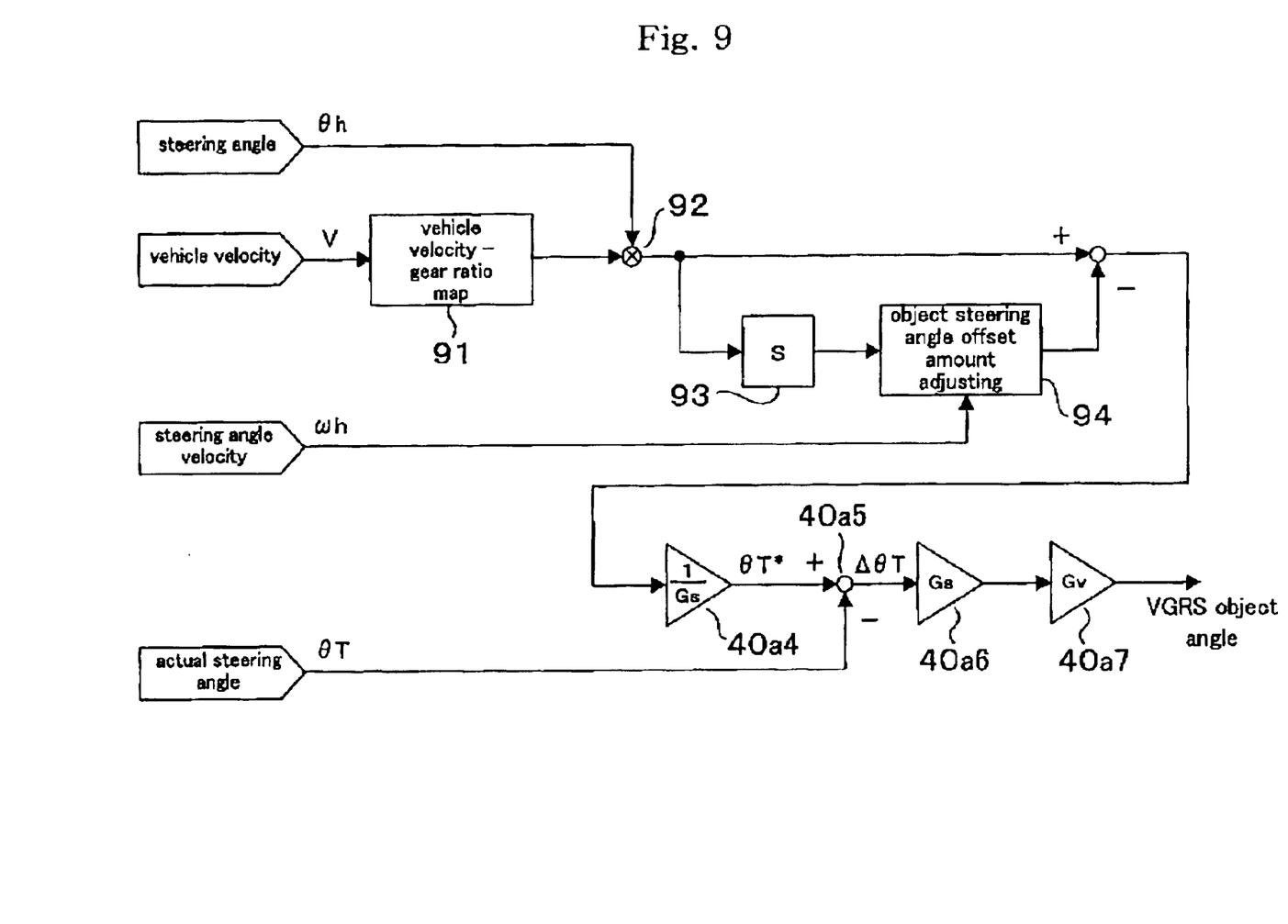
FIG. 9 is a functional block diagram showing the functional configuration of the vehicle operation control processing according to a comparative example.

For example, as compared to a case where the vehicle velocity—gear ratio map 91 (variable gain) is controlled based on only the vehicle velocity V as seen in the functional configuration of the vehicle operation control processing of the comparative example shown in FIG. 9, the variable gain G can be controlled based on the steering angle velocity by the steering wheel 21, the turning direction or the actual steering angle θT of the driven wheels FR, FL as well.

That is, in the vehicle operation control processing of the comparative example shown in FIG. 9, the gear ratio is determined based on the vehicle velocity V by the vehicle velocity—gear ratio map 91 and the determined gear ratio is multiplied with the steering angle θh by a multiplying means 92 so as to obtain an output steering angle. However, if it is so constructed that this output steering angle is converted to an object actual steering angle θT* by the object actual steering angle computing means 40a4 and a deviation of the object actual steering angle θT* with respect to the actual steering angle θT is obtained by the deviation amount detecting means 40a5 so as to compute the angle deviation ΔθT, when a vehicle driver turns the steering wheel suddenly, steering control on driven wheels is continued toward a object angle even after the vehicle driver terminates his steering operation due to a follow-up delay in control by the gear ratio changing mechanism. Consequently, the vehicle driver is supplied with a feeling of disharmony thereby his steering feeling being worsened.

Thus, in the vehicle operation control processing of this comparative example, a steering angle change amount Δθh in the steering angle θh is obtained by the steering angle change amount detecting means 93 and if the obtained steering angle change amount Δθh exceeds a predetermined threshold θth, its excessive amount (Δθh−θth) is outputted by an object steering angle offset amount adjusting means 94 and then that excessive amount is subtracted from the steering angle Δθh so as to adjust the angle deviation ΔθT at the time of sudden steering operation. In the meantime, this predetermined threshold θth is set up to change depending upon the steering angle velocity ωh.

As a result, according to the vehicle operation control processing of the comparative example, if the sudden steering operation is performed, the angle deviation ΔθT is changed to a control object value which generates no follow-up delay by the object steering angle offset amount adjusting means 94. Thus, occurrence of phenomenon that the steering control on the driven wheels is continued even after the vehicle driver terminates his steering operation is suppressed, thereby preventing his steering feeling from being worsened.

However, even under such a structure, if a quick steering is performed only at the time of additional turning and the steering operation is made slow at the time of turning-back, the steering angle change amount Δθh obtained by the steering angle change amount detecting means 93 does not exceed the predetermined threshold θth. Thus, that excessive amount (Δθh−θth) is not outputted by the object steering angle offset amount adjusting means 94. Thus, the angle deviation ΔθT is not changed although it is changed at the time of a quick steering, however the steering control is achieved with a firstly set angle deviation ΔθT. However, because the steering amount of the driven wheels is different between the additional turning time and the turning-back time, although the vehicle driver performs steering operation by the same amount at the times of the additional turning and turning-back, deviation in neutral position occurs. Meanwhile, this comparative example is equivalent to the "vehicle steering apparatus" disclosed in the JP 11-208499 A.

Figure 4:
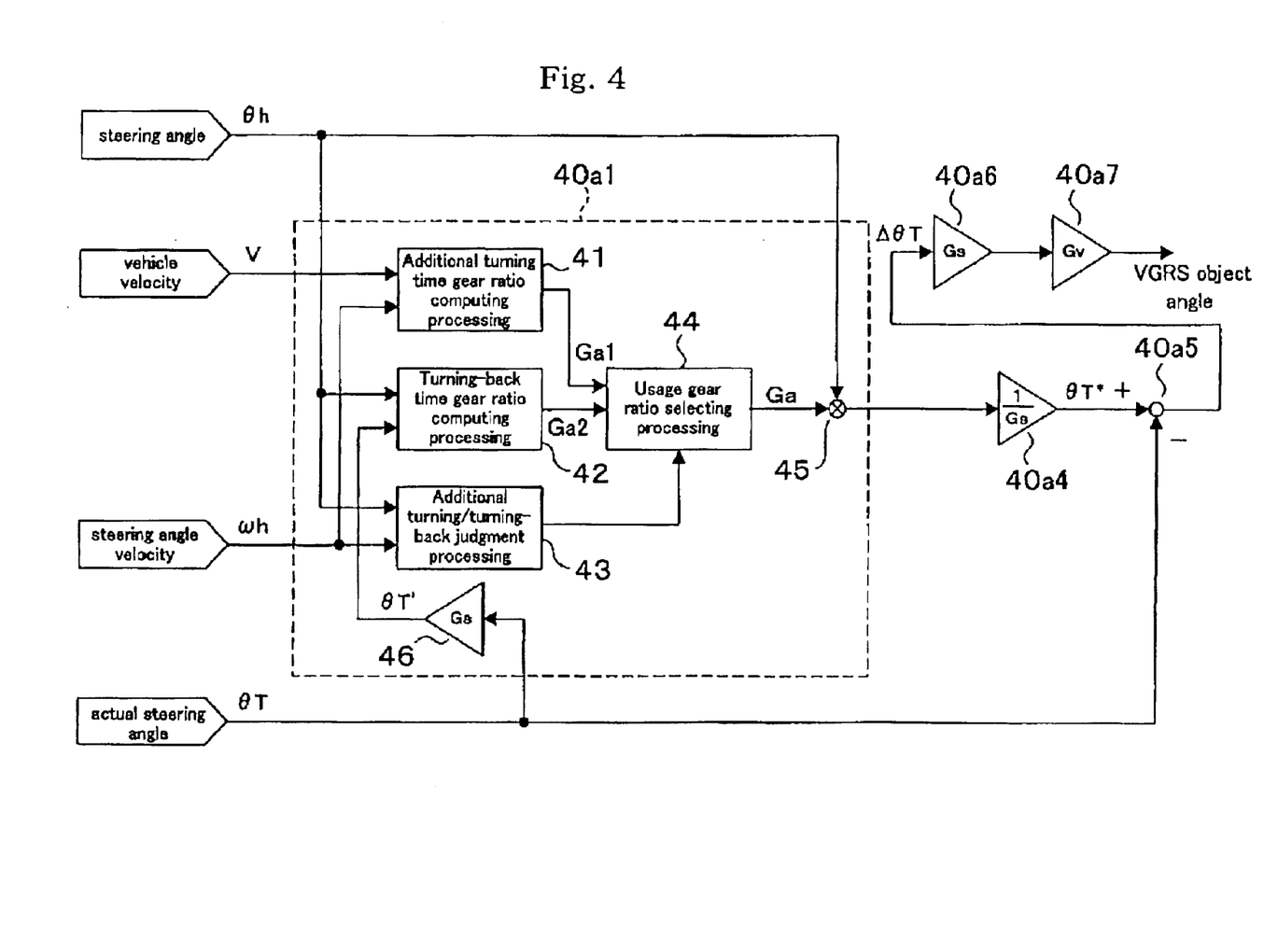
FIG. 4 is a functional block diagram showing a specific functional configuration of the vehicle operation control processing which is applied to the VGRS control processing of the embodiment.

Thus, as shown in FIG. 4, according to the vehicle operation control processing of this embodiment, the output steering angle determining means 40a1 is so constructed that additional turning time gear ratio computing processing 41, which is capable of correcting a follow-up delay in the actual angle control on the driven wheels FR, FL due to the quick steering, is performed at the time of the additional turning operation and turning-back time gear ratio computing processing 42, which is capable of correcting a deviation in the neutral position of the steering wheel 21 is performed at the time of turning-back. The functional block of the vehicle operation control processing shown in FIG. 4 indicates an example of the structure in which the basic functional block of the vehicle operation control processing described in FIG. 3 is applied to the VGRS control processing 40a. The same reference numerals are attached to substantially the same components as those shown in FIG. 3.

That is, as shown in FIG. 4, the output steering angle determining means 40a1 comprises the additional turning time gear ratio computing processing 41, the turning-back time gear ratio computing processing 42, an additional turning/turning-back determining processing 43, a usage gear ratio selecting processing 44, a multiplying processing 45 and a steering angle conversion processing 46, which are executed by the VGRS ECU 40.

The additional turning time gear ratio computing processing 41 executes a processing of outputting the gear ratio Ga1 at the time of additional turning by inputting the vehicle velocity V detected by the vehicle velocity sensor 27 and the steering angle velocity ωh obtained by time-differentiating the steering angle θh detected by the steering angle sensor 26.

Figure 5:
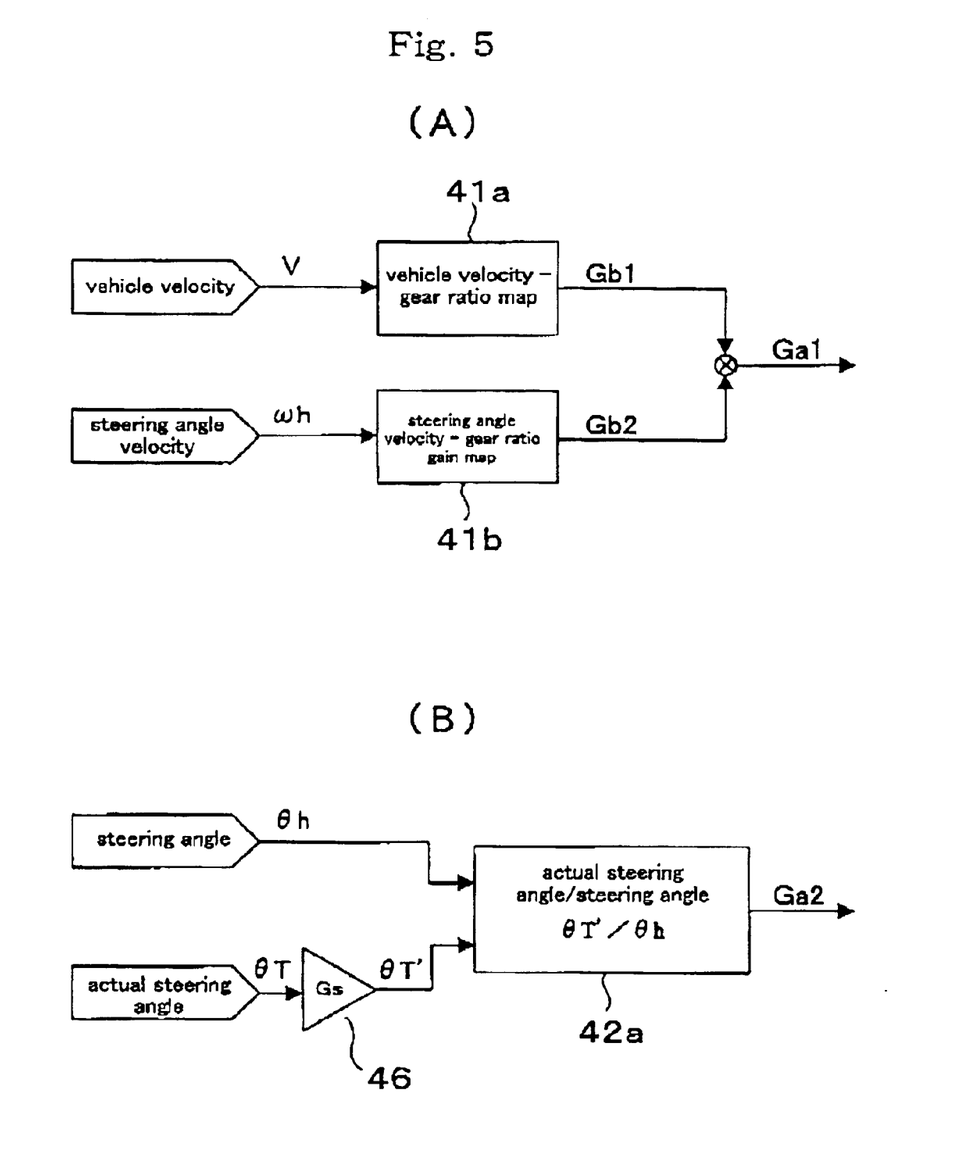
FIG. 5(A) is a functional block diagram showing an example of functional configuration of gear ratio computing operation at the time of additional turning shown in FIG. 4
FIG. 5(B) is a functional block diagram showing an example of functional configuration of gear ratio computing operation at the time of turning-back shown in FIG. 4.
Figure 6:
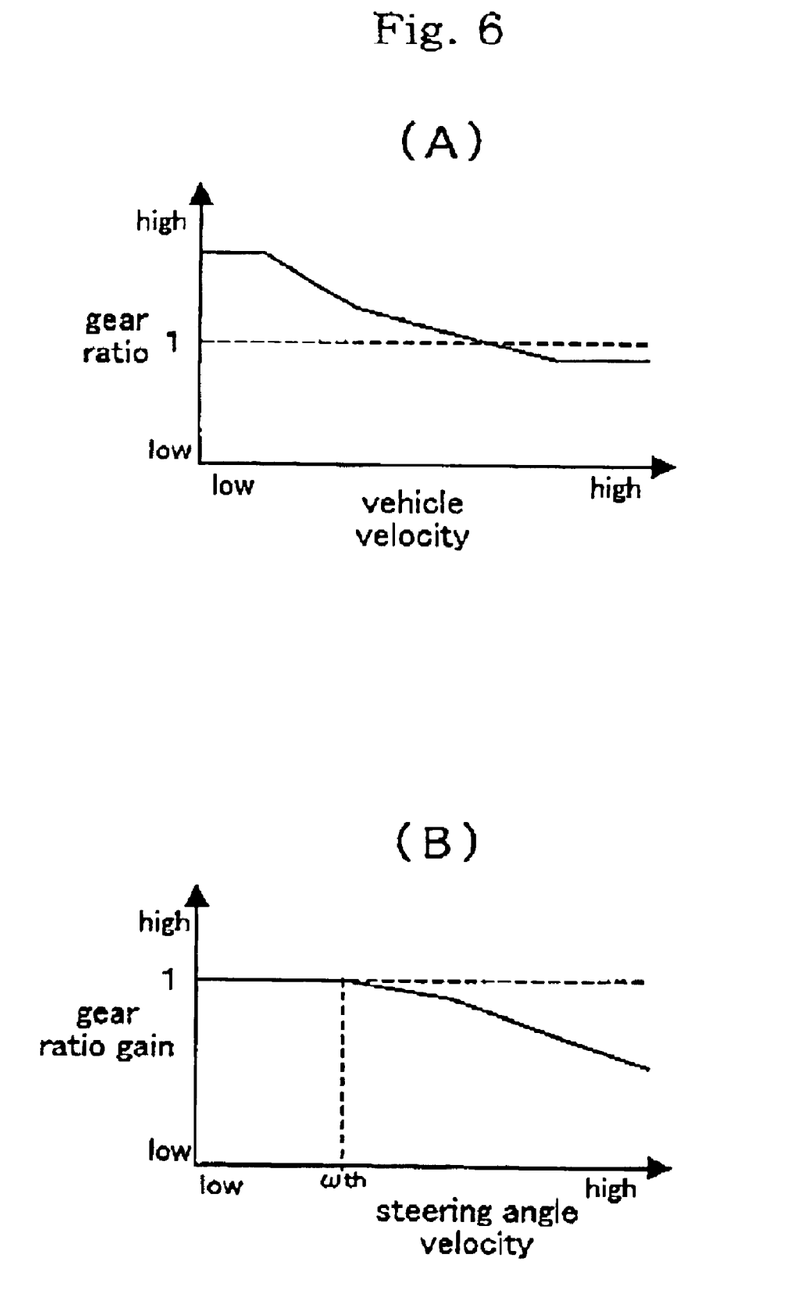
FIG. 6(A) is an explanatory diagram showing an example of vehicle velocity—gear ratio map shown in FIG. 5(A) and FIG. 6(B) is an explanatory diagram showing an example of steering angle velocity—gear ratio gain map shown in FIG. 5(A)

More specifically, as shown in FIG. 5(A), the gear ratio Gb1 corresponding to the vehicle velocity V is determined according to the vehicle velocity—gear ratio map 41a (see FIG. 6(A)), which is capable of automatically determining the transmission ratio based on the vehicle velocity V by means of the gear ratio changing mechanism 32. Further, the gear ratio gain Gb2 corresponding to the steering angle velocity ωh is determined according to the steering angle velocity—gear ratio gain map 41b (see FIG. 6(B)), which is capable of automatically determining the gear ratio gain based on the steering angle velocity ωh. Then, the gear ratio Gb1 is multiplied with the gear ratio gain Gb2 so as to compute the gear ratio Ga1 at the time of additional turning.

For a following reason, instead of outputting the gear ratio Gb1 determined based on the vehicle velocity—gear ratio map 41a as the gear ratio Ga1 at the time of additional turning, the gear ratio gain Gb2 determined based on the steering angle velocity—gear ratio gain map 41b is multiplied with the gear ratio Ga1.

That is, as shown in FIG. 6(B), the steering angle velocity—gear ratio gain map 41b is set up so that when the steering angle velocity ωh by the steering wheel 21 exceeds the predetermined value ωth, the gear ratio gain Gb2 is lower (smaller) than 1 as the steering angle velocity ωh is increased (becomes higher), so that the additional turning time gear ratio Ga1 can be controlled regardless of the vehicle velocity V.

Thus, because if as shown in FIG. 6A. the vehicle velocity V is low (slow), the gear ratio Gb1 is set higher than a case where the vehicle velocity V is high (fast)(vehicle velocity—gear ratio map 41a), gear ratio Ga1 is set to quick in order to increase the actual steering angle θT of the driven wheels FR, FL even if the steering angle θh by the steering wheel 21 is small. However, if the steering angle velocity ωh exceeds the predetermined value ωth due to a quick steering, the gear ratio gain Gb2 becomes lower (smaller) than 1 (steering angle velocity—gear ratio gain map 41b). Consequently, the gear ratio Ga1 can be set to such an extent that the control by the gear ratio changing mechanism 32 can be followed up. Therefore, a follow-up delay in control due to the quick steering can be prevented.

In the turning-back time gear ratio computing processing 42, the turning-back time gear ratio Ga2 is outputted by inputting a steering angle θh detected by the steering angle sensor 26 and an actual steering angle θT detected by the tire angle sensor accommodated in the EPS actuator 24.

More specifically, as shown in FIG. 5, the actual steering angle θT is inputted to the turning-back time gear ratio computing processing 42 as an actual steering angle θT' equivalent to the steering angle after it is converted to that steering angle through the steering angle conversion processing 46. Then, by dividing the actual steering angle θT' similar to the steering angle by the steering angle θh (i.e. calculating θT'/θh) through the division processing 42a, the gear ratio Ga2 at the time of turning-back is computed. That is, by paying attention to that after the turning-back, the steering wheel 21 can be set at a neutral position by returning the steering wheel 21 just by an amount equivalent to a current actual steering angle θT, the current actual steering angle θT is converted to the actual steering angle θT' similar to the steering angle, so that the gear ratio Ga2 which allows the turning-back by that amount is obtained from θT'/θh.

Consequently, the gear ratio Ga2 which allows the turning-back by the same amount as the actual steering angle θT, by which the steering wheel 21 is steered additionally before, is outputted, so that regardless of which the steering operation at the time of the turning-back is slow or quick, the steering wheel 21 can be located at the neutral position at the time of the turning-back. Further, because the computing processing for the gear ratio Ga2 by the turning-back time gear ratio computing processing 42 at the time of the turning-back does not depend on the vehicle velocity V, the steering wheel 21 can be located at the neutral position even if a vehicle's traveling velocity is changed during the turning-back operation.

Figure 7:
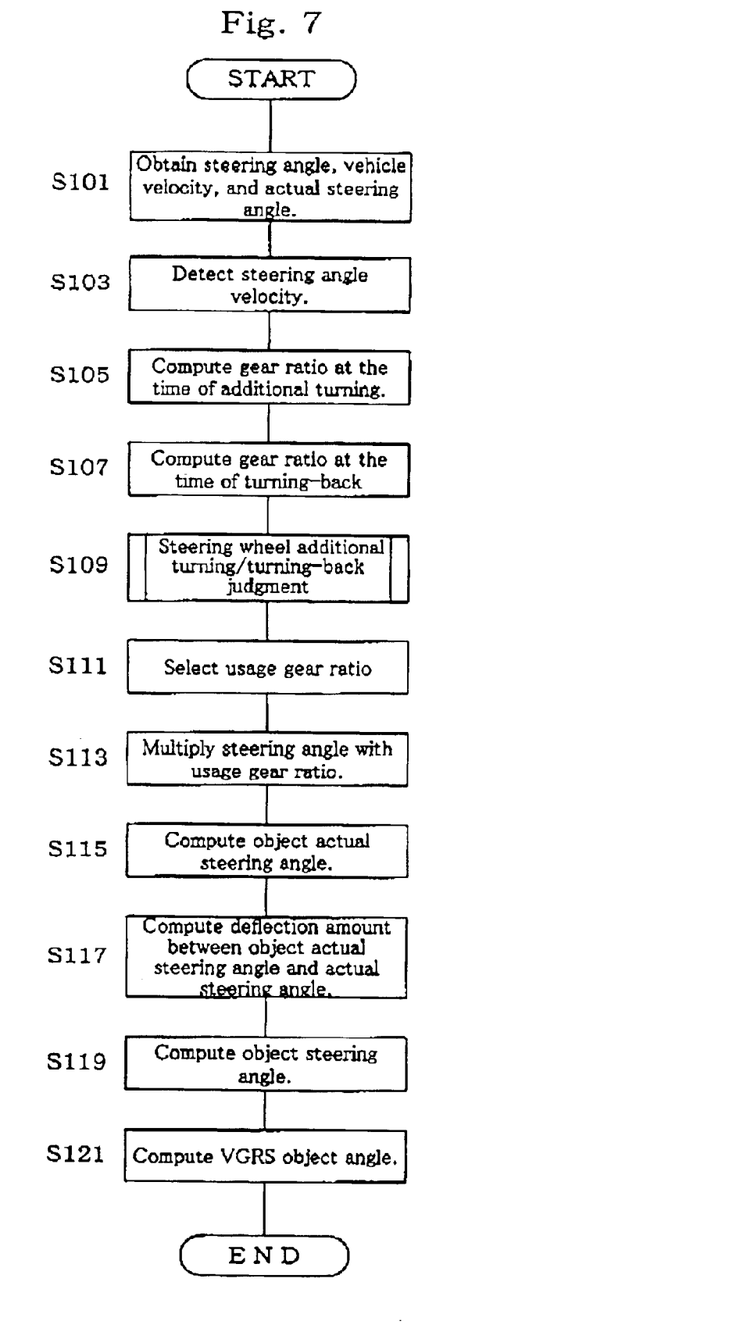
FIG. 7 is a flow chart showing a flow of the vehicle operation control processing of the embodiment.

Next, the above-described vehicle operation control processing will be described about a computing processing flow through the VGRS control processing 40a by the VGRS ECU 40 with reference to FIGS. 7, 8. In the meantime, this vehicle operation control processing is carried out by executing respective processings in steps S101–S121 successively as shown in FIG. 7 and for example, executed periodically (for example, every 5 milliseconds) by timer interruption or the like.

(1) Step S101

In this step, a processing for obtaining the steering angle θh, the vehicle velocity V and the actual steering angle θT is carried out. The steering angle θh is obtained by receiving a steering angle signal detected by the steering angle sensor 26 from the steering angle sensor 26 or other ECU. The vehicle velocity V is obtained by receiving a vehicle velocity signal detected by the vehicle velocity sensor 27 from the vehicle velocity sensor 27 or the like. Further, the actual steering angle θT is obtained by receiving an actual steering angle signal detected by the tire angle sensor accommodated in the EPS actuator 24 through the EPS ECU 30.

(2) Step S103

In this step, a processing of detecting a steering angle velocity ωh is carried out. This processing aims at obtaining the steering angle velocity ωh based on a steering angle θh obtained from step S101 and for example, by time-differentiating the steering angle θh, the steering angle velocity ωh is computed.

(3) Step S105

In this step, a processing of computing a gear ratio at the time of additional turning is carried out. This processing is carried out through the additional turning time gear ratio computing processing 41 shown in FIGS. 4 and 5A. The gear ratio Gb1 determined according to the vehicle velocity—gear ratio map 41a corresponding to the vehicle velocity V obtained through the step S101 is multiplied with the gear ratio gain Gb2 determined according to the steering angle velocity—gear ratio gain map 41b corresponding to the steering angle velocity ωh computed through the step S103 so as to obtain the gear ratio Ga1 at the time of the additional turning. In the meantime, the vehicle velocity—gear ratio map 41a and the steering angle velocity—gear ratio gain map 41b are constituted of data table stored by a semiconductor storage unit in the VGRS ECU 40, for example.

(4) Step S107

In this step, a processing of computing a gear ratio at the time of turning-back is carried out. This processing is carried out through the turning-back time gear ratio computing processing 42 shown in FIGS. 4, 5B, in which the actual steering angle θT obtained in step S101 is converted to a steering angle through the steering angle conversion processing 46 and the actual steering angle θT' similar to the steering angle is divided by the steering angle θh obtained in step S101 so as to obtain the turning-back time gear ratio Ga2.

(5) Step S109

In this step, a processing of judging steering wheel additional turning or turning-back is carried out. This processing is carried out through the additional turning/turning-back judgment processing 43 described previously and executed to judge which the steering wheel 21 is turned in an additional turning direction which increases the steering angle θh or in a turning-back direction which decreases the steering angle θh based on the steering angle θh and the steering angle velocity ωh. This processing is executed according to a subroutine shown in FIG. 8. Here, this subroutine will be described with reference to FIG. 8.

Figure 8:
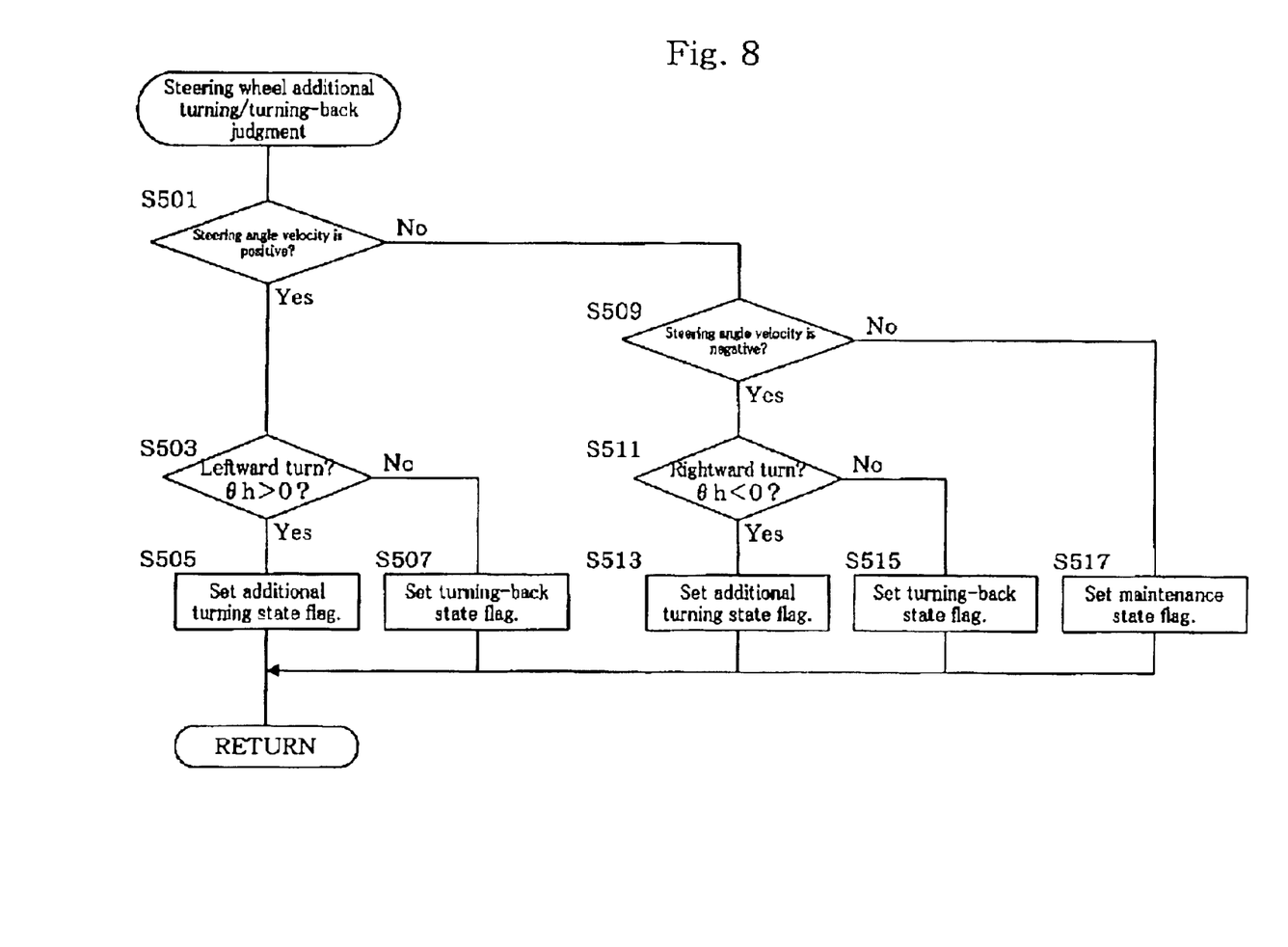
FIG. 8 is a flow chart showing a flow of steering wheel additional turning/turning-back determining processing shown in FIG. 7.

In the steering wheel additional turning/turning-back processing as shown in FIG. 8, in step S501, whether or not the steering angle velocity ωh is positive is judged based on a steering angle velocity ωh computed in step S103. Then, if it is judged that the steering angle velocity ωh is positive (YES in S501), the processing proceeds to step S503.

In step S503, if the steering angle velocity ωh is positive, whether or not the turning direction by the steering wheel 21 is leftward or whether or not the relation of steering angle θh>0 is established is judged. If this relation is established (YES in S503), because the turning direction is leftward, the processing proceeds to step S505, in which an additional turning state flag indicating that additional turning state is secured is set up.

If it cannot be judged that the turning direction is leftward through the judgment processing in step S503 (NO in S503), because the turning direction is rightward, the processing proceeds to step S507, in which a turning-back state flag indicating that the turning-back state is secured is set up.

On the other hand, if it cannot be judged that the steering angle velocity ωh is positive through the judgment processing in step S501 (NO in S501), because the steering angle velocity ωh is negative or zero, the processing proceeds to step S509, in which whether or not the steering angle velocity ωh is negative is judged.

If it can be judged that the steering angle velocity ωh is negative in step S509 (YES in S509), the processing proceeds to step S511, in which whether or not the turning direction by the steering wheel 21 is rightward or the relation of steering angle θh<0 is established is judged. If that relation is established (YES in S511), because the turning direction is rightward, the processing proceeds to step S513, in which an additional turning state flag indicating that the additional turning state is secured is set up.

If it cannot be judged that the turning direction is rightward through the judgment processing of step S511 (NO in S511), because the turning direction is leftward, the processing proceeds to step S515, in which a turning-back state flag indicating that the turning-back state is secured is set up.

If it cannot be judged that the steering angle velocity ωh is negative in step S509 (NO in S509), the processing proceeds to step S517, in which a steering maintenance state flag indicating that the steering is maintained is set up.

If the state flag is set up in steps S505, S507, 5513, S515, 5517, a sequence of the steering wheel additional turn/turn-back judgment processing is terminated and then, the processing proceeds to vehicle operation control processing, in which the processing proceeds to step s111 in FIG. 7.

(6) Step S111

In this step, a processing of selecting the gear ratio Ga, which is used as a transmission ratio by the gear ratio changing mechanism 32 is carried out. This processing is executed through the usage gear ratio selecting processing 44 shown in FIG. 4 and that usage gear ratio Ga is similar to the variable gain G.

That is, based on the state flag obtained from the steering wheel additional turning/turning-back judgment processing in step S109, which the steering wheel is in the additional turning direction, the turning-back direction or maintained is judged. If the steering wheel 21 is turned in the additional turning direction (when the additional turning state flag is set up), the gear ratio Ga1 at the time of additional turn computed in step S105 is selected as the usage gear ratio Ga. On the other hand, if the steering wheel 21 is turned in the turning-back direction (when the turning-back flag is set up), the gear ratio Ga2 at the time of turning-back computed in step S107 is selected as the usage gear ratio Ga.

When the steering maintenance state flag is set up, the steering wheel 21 is maintained at a specific steering angle θh without being turned around and therefore, the steering angle velocity ωh becomes zero. Because as the usage gear ratio Ga, it is permissible to select any one of the additional turning time gear ratio Ga1 or the turning-back time gear ratio Ga2. it is assumed that the additional turning time gear ratio Ga1 is selected as the usage gear ratio Ga according to this embodiment.

(7) Step S113

In this step, a processing of multiplying the steering angle θh with the usage gear ratio Ga is carried out. This processing is executed through the multiplying processing 45 shown in FIG. 4, in which the steering angle θh obtained in step S101 is multiplied with the usage gear ratio Ga selected in step S111 through the multiplying processing 45 and its multiplication result is outputted as an output steering angle. Consequently, the processing by the output steering angle determining means 40a1 shown in FIG. 4 is terminated and an output steering angle is outputted from the output steering angle determining means 40a1 to the object actual steering angle computing means 40a4 in a next step.

(8) Step S115

In this step, a processing of computing the object actual steering angle θT* is carried out. That is, by dividing the output steering angle by the steering gear ratio Gs by the object actual steering angle computing means 40a4 shown in FIG. 4, it is possible to obtain the object actual steering angle θT* corresponding to the same amount as a change amount of the steering angle θh by the steering wheel 21.

(9) Step S117

In this step, a processing of computing a deviation amount between the object actual steering angle θT* and the actual steering angle θT is carried out. That is, by subtracting the actual steering angle θT obtained in step S101 from the object actual steering angle θT* by the deviation amount detecting means 40a5 shown in FIG. 4, it is possible to obtain a deviation of the actual steering angle θT with respect to the object actual steering angle θT* that is, a angle deviation ΔθT.

(10) Step S119

In this step, a processing of computing the object steering angle is carried out. That is, by multiplying the steering gear ratio Gs with the angle deviation ΔθT computed in step S117 by the object steering angle computing means 40a6 shown in FIG. 4, the actual steering angle is converted to the steering angle, so that the object steering angle can be obtained.

(11) Step S121

In this step, a processing of computing the VGRS object angle is carried out. That is, by multiplying the gear ratio Gv of the reduction gear 32g in the gear ratio changing mechanism 32 with the object steering angle computed in step S119 by the VGRS object angle computing means 40a7 shown in FIG. 4, the steering angle is converted to the VGRS object angle and consequently, the VGRS object angle is obtained.

As described above, by executing a sequence of the vehicle operation control processing from step S101 to step S121, the vehicle operation control apparatus 20 multiplies the usage gear ratio Ga, which is the variable gain G controlled based on the vehicle velocity V, the steering angle θh, the steering angle velocity ωh and the actual steering angle θT with the steering angle θh, and controls the actual steering angle θT of the driven wheels FR, FL based on an output steering angle, which is a result of this multiplication. Then, which the steering wheel 21 is turned in the additional turning direction which increases the steering angle θh or in the turning-back direction which decreases the steering angle θh is judged based on the steering angle θh and the steering angle velocity ωh. If it is judged that the steering wheel is turned in the additional turning direction, the additional turn time gear ratio Ga1 is selected from the variable gain G and if it is judged that the steering wheel is turned in the turning-back direction, the turning-back time gear ratio Ga2 is selected from the variable gain G. Consequently, the additional turning time gear ratio Ga1 or the turning-back gear ratio Ga2, set up individually, can be selected depending on the turning direction of the steering wheel 21.

As for the gear ratio Ga1 at the time of additional turning, the gear ratio Ga1 is determined according to the vehicle velocity—gear ratio map 41a based on the vehicle velocity V and the steering angle velocity ωh. As for the turning-back time gear ratio Ga2, the gear ratio Ga2 is determined according to the steering angle velocity—gear ratio gain map 41b based on the steering angle θh and the actual steering angle θT. Consequently, as for the gear ratio Ga1 at the time of additional turning, the gear ratio Ga1 is determined based on not only the vehicle velocity V but also the steering angle velocity ωh, so that the additional turning time gear ratio Ga1 can be determined corresponding to the steering angle velocity ah by the steering wheel 21. As for the gear ratio Ga2 at the time of turning-back, the gear ratio Ga2 is determined based on the steering angle θh and the actual steering angle θT regardless of the vehicle velocity V. By dividing the actual steering angle θT' similar to the steering angle by the steering angle θh (θT'/θh), the gear ratio Ga2 can be determined so that when the steering wheel 21 is located at a neutral position, the driven wheels are located at their neutral positions. Therefore, the steering feeling both at the time of additional turning and turning-back can be improved.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A vehicle operation control method for controlling an actual steering angle of driven wheels based on a steering angle by a steering wheel and vehicle velocity, comprising:

a first step of obtaining a steering angle velocity based on the steering angle by the steering wheel;

a second step of obtaining the actual steering angle of the driven wheels;

a third step of controlling a variable gain based on the vehicle velocity, the steering angle, the steering angle velocity and the actual steering angle;

a fourth step of multiplying the variable gain with the steering angle; and a fifth step of controlling the actual steering angle of the driven wheels based on a result of multiplication in the fourth step.

2. The vehicle operation control method according to claim 1 wherein the third step comprises:

a 3a step of judging which the turning direction of the steering wheel is in an additional turning direction which increases the steering angle or in a turning-back direction which decreases the steering angle, based on the steering angle and the steering angle velocity; and a 3b step of if the turning direction of the steering wheel judged in the 3a step is the additional turning direction, selecting an additional turning time variable gain as the variable gain and if the turning direction is the turning-back direction, selecting the turning-back time variable gain as the variable gain.

3. The vehicle operation control method according to claim 2 wherein as for the additional turning time variable gain of the third step, the variable gain is determined based on the vehicle velocity and the steering angle velocity and as for the turning-back time variable gain of the third step, the variable gain is determined based on the steering angle and the actual steering angle.

4. A vehicle operation control apparatus for controlling an actual steering angle of driven wheels based on a steering angle by a steering wheel and vehicle velocity, comprising:

a steering angle velocity obtaining means for obtaining a steering angle velocity based on the steering angle by the steering wheel;

an actual steering angle obtaining means for obtaining the actual steering angle of the driven wheels;

a variable gain control means for controlling a variable gain based on the vehicle velocity, the steering angle, the steering angle velocity and the actual steering angles;

a multiplying means for multiplying the variable gain with the steering angle; and an actual steering angle control means for controlling the actual steering angle of the driven wheels based on a result of multiplication by the multiplying means.

5. The vehicle operation control apparatus according to claim 4 wherein the variable gain control means comprises:

a turning direction judgment means for judging which the turning direction of the steering wheel is in an additional turning direction which increases the steering angle or in a turning-back direction which decreases the steering angle, based on the steering angle and the steering angle velocity; and a variable gain selection control means for, if the turning direction of the steering wheel judged by the turning direction judgment means is the additional turning direction, selecting an additional turning time variable gain as the variable gain and if the turning direction is the turning-back direction, selecting the turning-bank time variable gain as the variable gain.

6. The vehicle operation control apparatus according to claim 5 wherein as for the additional turning time variable gain by the variable gain control means, that variable gain is determined based on the vehicle velocity and the steering angle velocity and as for the turning-back time variable gain by the variable gain control means, that variable gain is determined based on the steering angle and the actual steering angle.

* * * * *